S. R. GOING.
Cooking Stove.
No. 3,362. Reissued April 6, 1869.
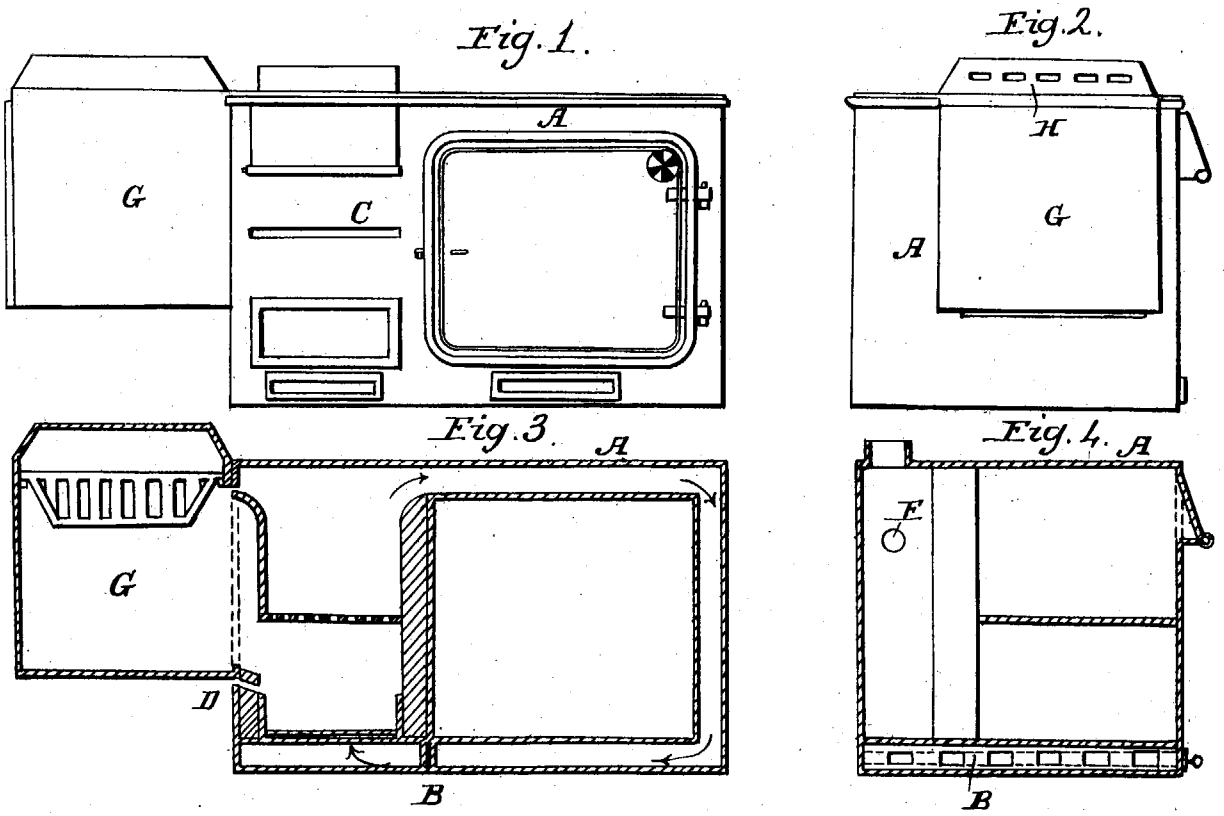
Witnesses:
Elisha Forbes
M Haskell
Inventor:
Stephen R. Going.
N. PETERS, Photo-Lithographer, Washington, D. C.

United States Patent Office.

DAVID S. QUIMBY AND DAVID S. QUIMBY, JR., OF BROOKLYN, NEW YORK, ASSIGNEES OF STEPHEN R. GOING.

*Letters Patent No.* 35,658, *dated June* 17, 1862; *reissue No.* 3,362, *dated April* 6, 1869.

COOKING-STOVE.

The Schedule referred to in these Letters Patent and making part of the same.

*To all whom it may concern:*

Be it known that STEPHEN R. GOING, of Brooklyn, in the county of Kings, in the State of New York, did invent a new and useful Improvement in Ranges for Cooking, &c.; and the following is declared to be a full and exact description thereof, reference being had to the accompanying drawing, and to the letters of reference marked thereon, in which—

Figure 1 is a front elevation of the range;

Figure 2 is an end elevation of the boiler and roaster end;

Figure 3 is a longitudinal section; and

Figure 4 is a transverse section, showing the graduated damper.

The nature of this said invention consists in a regulator, applied in the flue, at the lower part of the oven, near where the products of combustion pass away, so as to detain the heat below the oven, and render the same more effective than in cases where the products of combustion pass directly away.

This regulator is also formed in such a manner that the products of combustion will be directed toward the front part of the oven, to equalize the heat in the oven; and a roaster and boiler are combined with said range.

To enable others skilled in the art to make and use the invention, its construction and operation are described, as follows:

This range is made in any of the known forms, and to the under side or lower flue of the oven is applied a draught-regulator, or damper, B, located near the point where the products of combustion pass away from below said oven; and several holes are provided in its length, the larger being in front, and gradually decreasing in size to the back end of the oven, to produce an equal heat in and around said oven.

A is the shell of the range, made in the ordinary way.

Holes, or apertures are shown at C and D, for admission of air for rapid circulation and quick combustion.

The oven is shown as fitted with a register, at E, and an aperture, F, passing into the flue.

G is a roaster and boiler, that may be ventilated at H.

The roaster and boiler is made of a size to be placed inside of the oven of the range, which is a great convenience in transportation.

What is claimed, and to be secured by Letters Patent, is—

1. A draught-regulator, applied in the oven-flue, near where the products of combustion pass away from under the oven, substantially as and for the purposes set forth.

2. In combination with an oven, and the flues thereof, a draught-regulator, formed of a range of holes that are larger at the front than toward the back of the oven, substantially as and for the purposes set forth.

3. A sliding damper, formed with holes decreasing from the front of the range toward the back, and applied in the flue that passes below the oven, substantially as set forth.

Dated this 8th day of January, A. D. 1869.

DAVID S. QUIMBY.
DAVID S. QUIMBY, JR.

Witnesses:
CHAS. H. SMITH,
GEO. T. PINCKNEY.